(12) United States Patent
Morikawa et al.

(10) Patent No.: US 10,376,974 B2
(45) Date of Patent: Aug. 13, 2019

(54) SECTIONAL HOB

(71) Applicant: MITSUBISHI MATERIALS CORPORATION, Tokyo (JP)

(72) Inventors: Masanori Morikawa, Akashi (JP); Kousei Torii, Anpachi-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 113 days.

(21) Appl. No.: 15/315,494

(22) PCT Filed: Jun. 4, 2015

(86) PCT No.: PCT/JP2015/066182
§ 371 (c)(1),
(2) Date: Dec. 1, 2016

(87) PCT Pub. No.: WO2015/186788
PCT Pub. Date: Dec. 10, 2015

(65) Prior Publication Data
US 2017/0197264 A1 Jul. 13, 2017

(30) Foreign Application Priority Data

Jun. 4, 2014 (JP) .................. 2014-115970
Jan. 14, 2015 (JP) .................. 2015-005176

(51) Int. Cl.
*B23F 21/16* (2006.01)
*B23C 5/22* (2006.01)
*B23C 5/24* (2006.01)
*B27G 13/04* (2006.01)

(52) U.S. Cl.
CPC .......... *B23F 21/166* (2013.01); *B23C 5/2273* (2013.01); *B23C 5/2441* (2013.01); *B23F 21/16* (2013.01); *B27G 13/04* (2013.01)

(58) Field of Classification Search
CPC ...... B23F 5/22; B23F 5/24; B23F 9/08; B23F 9/082; B23F 11/00; B23F 21/16;
(Continued)

(56) References Cited

U.S. PATENT DOCUMENTS 1,853,667 A 4/1932 Cummings
2,456,842 A 12/1948 Rutbell
(Continued)

FOREIGN PATENT DOCUMENTS

DE 1959403 U 4/1967
DE 8604712 U1 11/1986
(Continued)

OTHER PUBLICATIONS

Search Report dated Dec. 20, 2017, issued for the European patent application No. 15803677.2.
(Continued)

*Primary Examiner* — Nicole N Ramos
(74) *Attorney, Agent, or Firm* — Lock Lorde LLP

(57) ABSTRACT

This sectional hob is provided with: a cylindrical hob body; a plate-shaped blade having a saw-toothed cutting edge, the blade being disposed in at least one attachment seat formed in an outer peripheral part of the hob body such that a direction of the cutting edge is parallel to a center axis direction of the hob body; and a plurality of wedge members configured to detachably-fix the blade disposed in the attachment seat to the hob body, the wedge members being installed in a recess formed on the outer peripheral part of the hob body, wherein the recess is adjacent to the attachment seat in a circumferential direction of the hob body, and the plurality of the wedge members are disposed in a line in the center axis direction in the recess.

6 Claims, 8 Drawing Sheets

(58) Field of Classification Search
CPC ............. B23F 21/163; Y10T 407/1715; Y10T 407/1725; Y10T 407/172; Y10T 407/173; Y10T 407/1745; Y10T 407/1705
See application file for complete search history.

(56) References Cited

U.S. PATENT DOCUMENTS

| | | | |
|---|---|---|---|
| 2,567,167 A | | 9/1951 | Drader |
| 2,706,848 A | * | 4/1955 | Riley .................... B23F 21/166 407/25 |
| 3,059,546 A | | 10/1962 | Johnson et al. |
| 4,205,932 A | * | 6/1980 | Tennutti ................ B23F 21/166 407/25 |
| 4,880,337 A | | 11/1989 | Tua Espallargas |
| 5,088,861 A | | 2/1992 | Little |
| 6,499,917 B1 | | 12/2002 | Parker et al. |
| 2014/0010606 A1 | * | 1/2014 | Sagstrom .................. B23C 5/08 407/51 |

FOREIGN PATENT DOCUMENTS

| | | |
|---|---|---|
| DE | 9108553.5 U1 | 10/1991 |
| EP | 2420340 A1 | 2/2012 |
| JP | 57-009422 U | 1/1982 |
| JP | 63-091321 A | 6/1988 |
| JP | 01-228718 A | 9/1989 |
| JP | 03-104511 A | 5/1991 |
| JP | 09-174332 A | 7/1997 |
| JP | 2001-353621 A | 12/2001 |
| JP | 2009-148886 A | 7/2009 |
| KR | 10-2013-0043511 A | 4/2013 |

OTHER PUBLICATIONS

International Search Report dated Sep. 1, 2015, issued for PCT/JP2015/066182 and English translation thereof.
Office Action dated Nov. 6, 2018, issued for the Japanese patent application No. 2015-005176 and English translation thereof.

* cited by examiner

SECTIONAL HOB

TECHNICAL FIELD

The present invention relates to a sectional hob for performing gear cutting work for gears, in which at least a blade having a saw-toothed cutting edge is detachably attached to an outer peripheral part of a hob body.

Priority is claimed on Japanese Patent Application No. 2014-115970, filed Jun. 4, 2014, and Japanese Patent Application No. 2015-005176, filed Jan. 14, 2015, the contents of which are incorporated herein by reference.

BACKGROUND ART

As such a sectional hob, Patent Document 1 suggests a sectional hob in which a plurality of grooves in an axial direction are formed at equal intervals in a circumferential direction in an outer peripheral surface of a tubular hob body, and a plurality of chevron-shaped blades are fitted into and fixed to supporters inserted into these grooves. Here, the above supporters are positioned in the axial direction by adjusting screws and hold-down pieces. Additionally, Patent Document 2 suggests that a blade is fixed to a hob body with an axial fastening screw that pressurizes the blade in a center axis direction of the hob body and a radial fastening screw that pressurizes the blade to a radial inner side. Additionally, Patent Document 1 also describes that a blade is split into a plurality of pieces in the center axis direction, and one blade is pressurized by pressing a tapered head part of one radial fastening screw against an inclined surface of the blade with the one radial fastening screw.

PRIOR ART DOCUMENTS

Patent Documents

Patent Document 1: Japanese Unexamined Utility Model Application, First Publication No. S63-091321
Patent Document 2: Japanese Unexamined Patent Application, First Publication No. H9-174332

SUMMARY OF INVENTION

Technical Problem

In such sectional hobs, the tapered head part of the radial fastening screw abuts against the inclined surface of the blade in a line. Therefore, particularly if one blade is pressurized and fixed by one radial fastening screw as described above, attachment of the blade becomes unstable. As a result, there is a concern that chattering may occur in the blade at the time of gear cutting work, and machining precision may be impaired.

Additionally, in the hob in which the plurality of grooves are formed at intervals in a circumferential direction at the outer periphery of the hob body in this way and the supporters, and the blades in which the saw-toothed cutting edges are formed are attached to these grooves, the supporters and the blades are also disposed so as to form a spiral shape such that the positions thereof are offset from each other in the axial direction and sequentially in the circumferential direction by sequentially offsetting the positions of the adjusting screws of the respective grooves and the positions of the hold-down pieces from each other such that the phases of the saw-toothed cutting edges of these blades have a constant lead around an axis.

However, it is difficult to perform positioning such that the chevron shapes mutually form a spiral shape with a constant lead precisely between the blades attached to such a plurality of grooves, and much time and labor are required for positioning of the supporters and the blades using the adjusting screws or the hold-down pieces. Additionally, if offset has occurred in the phase of a saw-toothed cutting edge of at least one of these blades, the precision of a gear subjected to gear cutting work is also impaired. This is the same not only in the sectional hob described in Patent Document 1 but also in solid or brazed hobs.

The invention has been made under such a background, and an object thereof is to provide a sectional hob in which blades can be stably attached to a hob body, and machining precision can be improved without requiring much time and labor for phase matching or the like of saw-toothed cutting edges.

Solution to Problem

A first aspect of a sectional hob of the invention includes: a cylindrical hob body; a plate-shaped blade having a saw-toothed cutting edge, the blade being disposed in at least one attachment seat formed in an outer peripheral part of the hob body such that a direction of the cutting edge is parallel to a center axis direction of the hob body; and a plurality of wedge members configured to detachably-fix the blade disposed in the attachment seat to the hob body, the wedge members being installed in a recess formed on the outer peripheral part of the hob body, wherein the recess is adjacent to the attachment seat in a circumferential direction of the hob body, and the plurality of the wedge members are disposed in a line in the center axis direction in the recess.

In the sectional hob configured in this way, the plurality of wedge members lined up in the center axis direction of the hob body are pressed onto the blade, thereby the blade is attached to the hob body. Thus, a large contact area between the wedge members and the blade can be secured, this blade can be pressed in a plurality of places in the above center axis direction in which the blade extends, and thereby, the blade can be stably attached to the hob body. Therefore, chattering can be prevented from occurring in the blade at the time of gear cutting work, and high machining precision can be obtained.

In a second aspect of the sectional hob of the invention as described in the first aspect, each of the wedge members may be plate-shaped or pillar-shaped, and the wedge members may be installed in the recess such that the longitudinal direction of each of the wedge members is parallel to the center axis direction. Accordingly, a larger contact area with the blade can be secured and attachment stability can be further improved.

In a third aspect of the sectional hob of the invention as described in the first or second aspect, a surface of the blade contacted with the wedge members in a state where the blade is fixed to the hob body may be formed as a scoop such that the thickness of the blade becomes smaller toward an outer periphery of the hob body. Accordingly, slip-out of the blade to the radial outer side from the hob body can be prevented.

In a fourth aspect of the sectional hob of the invention as described in any one of the first to third aspects, the sectional hob may be further includes: a plurality of the attachment seats formed in the hob body at intervals in the circumferential direction of the hob body; a plurality of the blades respectively fixed to the plurality of the attachment seats of the hob body, and wherein a first blade of the plurality of the blades is adjacent to a second blade of the plurality of the blades so as to be positioned side-by-side without offsetting each other in the center axis direction along with a saw-toothed cutting edge of the first blade is out of phase with a saw-toothed cutting edge of the second blade. Accordingly, gear cutting work can be performed by forming the rows of the above cutting edges twisted around the center axis at the outer periphery of the hob body, with the positions of all the blades in the above center axis direction being almost the same as each other.

In a fifth aspect of the sectional hob of the invention as described in any one of the first to fourth aspects, the sectional hob may be includes an adjuster mounted on the hob body to adjust the position of the blade in the center axis direction. As a result, machining precision can be further improved by adopting an arrangement such that the cutting edges of the respective blades precisely form the rows of the above cutting edges.

In a sixth aspect of the sectional hob of the invention based on any one of the first to third aspects, at least one attachment seat may be formed in the hob body, and one blade may be fixed to the one attachment seat. In the present aspect, since only one blade having the saw-toothed cutting edge is provided at the outer peripheral part of the hob body, a tooth form can be formed in a workpiece with this one blade, without being aligned in phase with another cutting edge, even if the pitch of the saw-toothed cutting edge of this blade is precisely formed. For this reason, neither time nor labor is required for phase matching.

Advantageous Effects of Invention

According to the invention, the blade can be stably attached to the hob body, chattering can be prevented from occurring in the blade at the time of gear cutting work, and high machining precision can be obtained.

DESCRIPTION OF EMBODIMENTS

Figure 1:
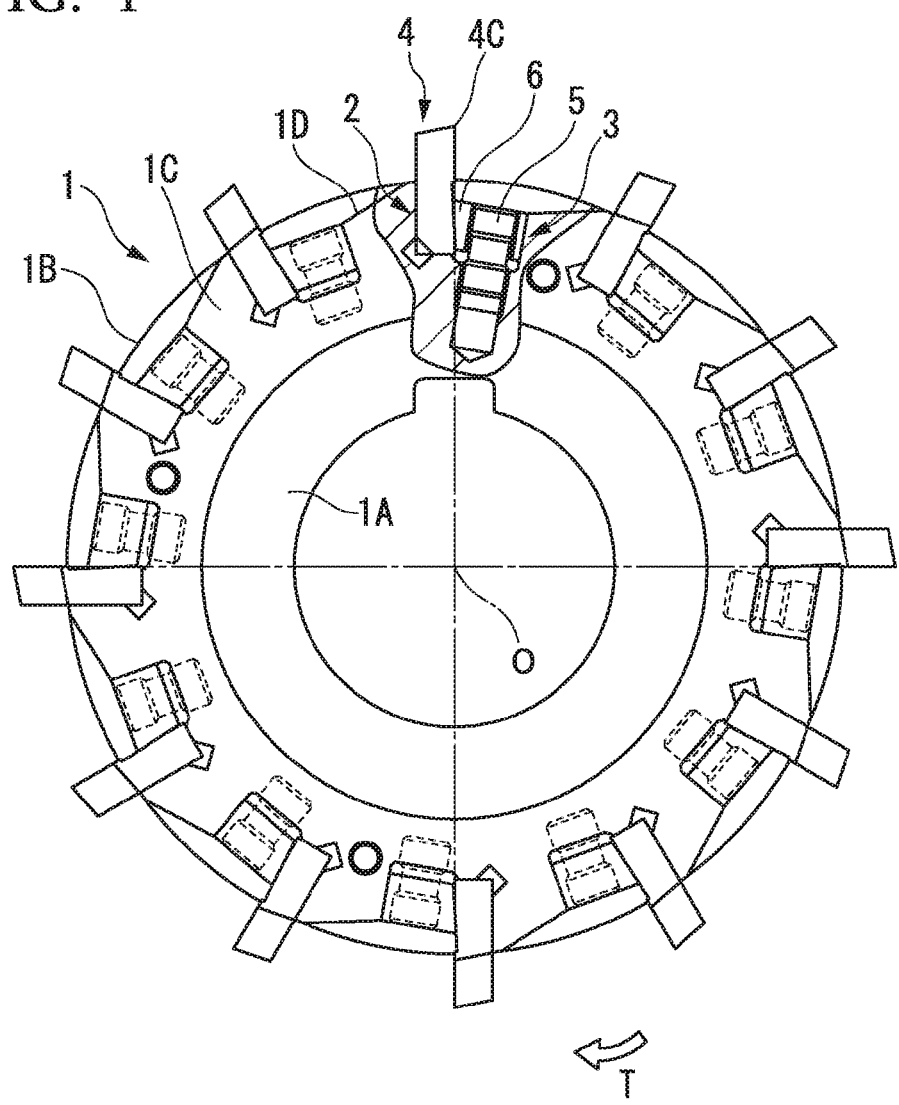
FIG. 1 is a partially fractured front view as a first embodiment of the invention is seen from one end side (a right side in FIG. 3) in a center axis direction.

FIGS. 1 to 5 show a first embodiment of the invention. In the first embodiment, a hob body 1 is formed of a steel material or the like and is formed in a multiple-step cylindrical outer shape in which both end parts 1A in a direction of a center axis O have mutually equal external diameters and have a smaller diameter than a trunk part 1B therebetween and which is centered on the center axis O. A rotating shaft of a hobbing machine is attached to the inside of the hob body in a radial direction, and the hob machine is used to perform gear cutting work while the hob body 1 in a rotational direction T around the above center axis O. In addition, the invention can also be applied to a sectional hob that performs gear cutting work, for example by a handle (shank) extending along the above center axis O being formed in the hob body and by the handle being attached to a main shaft of a machine tool and being rotated, in addition to the rotating shaft being attached to the inside of the cylindrical hob body 1 in the radial direction in this way.

An attachment seat 2, which is recessed from an outer peripheral surface of a trunk part 1B of the hob body to a radial inner side of a hob body 11 and extends parallel to the center axis O, is formed over the entire length in the direction of the center axis O in the outer peripheral surface of the trunk part 1B having a greater diameter than both the end parts 1A of the hob body 1. Thus, the attachment seat 2 opens to both the end surfaces 1C of the trunk part 1B. The attachment seat 2 includes a bottom surface 2A that faces a radial outer side of the hob body 1, and a wall surface 2B that is perpendicular to the bottom surface 2A and faces a forward side in the above rotational direction T, and a flank part 2C that is recessed in a channel (groove) shape is formed at a corner where the bottom surface 2A and the wall surface 2B intersect each other.

Additionally, a recess 3, which is adjacent to the attachment seat 2 in a circumferential direction of the hob body and communicates with the attachment seat 2, is formed in an outer peripheral part of the above trunk part 1B. In the first embodiment, the recess 3 is formed adjacent to the forward side of the attachment seat 2 in the rotational direction T, and has a bottom surface 3A that is located slightly closer to the radial inner side of the hob body 1 than the bottom surface 2A of the attachment seat 2, and a wall surface 3B that is located on the forward side of the bottom surface 3A in the rotational direction T and widens from the bottom surface 3A to the radial outer side of the hob body 1 and faces a backward side in the rotational direction T. The recess 3 is formed over the entire length in the direction of the center axis O so as to extend parallel to the center axis O and open to both the end surfaces 1C of the trunk part 1B, similar to the attachment seat 2. Moreover, a plurality of (three in the first embodiment) screw holes 3C having centerlines extending parallel to the wall surface 3B on a plane perpendicular to the center axis O are formed at equal intervals in the direction of the center axis O in the bottom surface 3A of the recess 3.

In the first embodiment, a plurality of (twelve) such attachment seats 2 and recesses 3 having the same shape and the same size are formed at equal intervals in the circumferential direction of the hob body 1. Additionally, an inclined surface 1D, which approaches an outer peripheral surface of the hob body 1 as it becomes closer to the forward side in the rotational direction T from an outer peripheral edge of the above wall surface 3B of each recess 3, is formed in the outer peripheral surface of the trunk part 1B, and the inclined surface 1D is cut and raised up in the outer peripheral surface of the trunk part 1B immediately before reaching the wall surface 2B of the attachment seat 2 adjacent to the backward side of the recess 3 in the rotational direction T, and forms a chip pocket while securing the thickness of the hob body 1 on the backward side of the wall surface 2B in the rotational direction T.

A blade 4 is detachably attached to the above respective attachment seat 2. The blade 4 is formed in a flat plate shape using a hard material, such as cemented carbide, a seating surface 4A directed to the radial inner side of the hob body 1 is brought into close contact with and made to abut against the bottom surface 2A of the attachment seat 2 with a thickness direction of this flat plate being directed to the circumferential direction of the hob body 1, and a back surface 4B directed to the backward side in the rotational direction T is seated on the attachment seat 2 in a state where the back surface 4B is brought into close contact with and made to abut against the wall surface 2B. In the first embodiment, one blade 4 having a length approximately equal to the length of the trunk part 1B of the hob body 1 in the direction of the center axis O is attached to one attachment seat 2.

Figure 3:
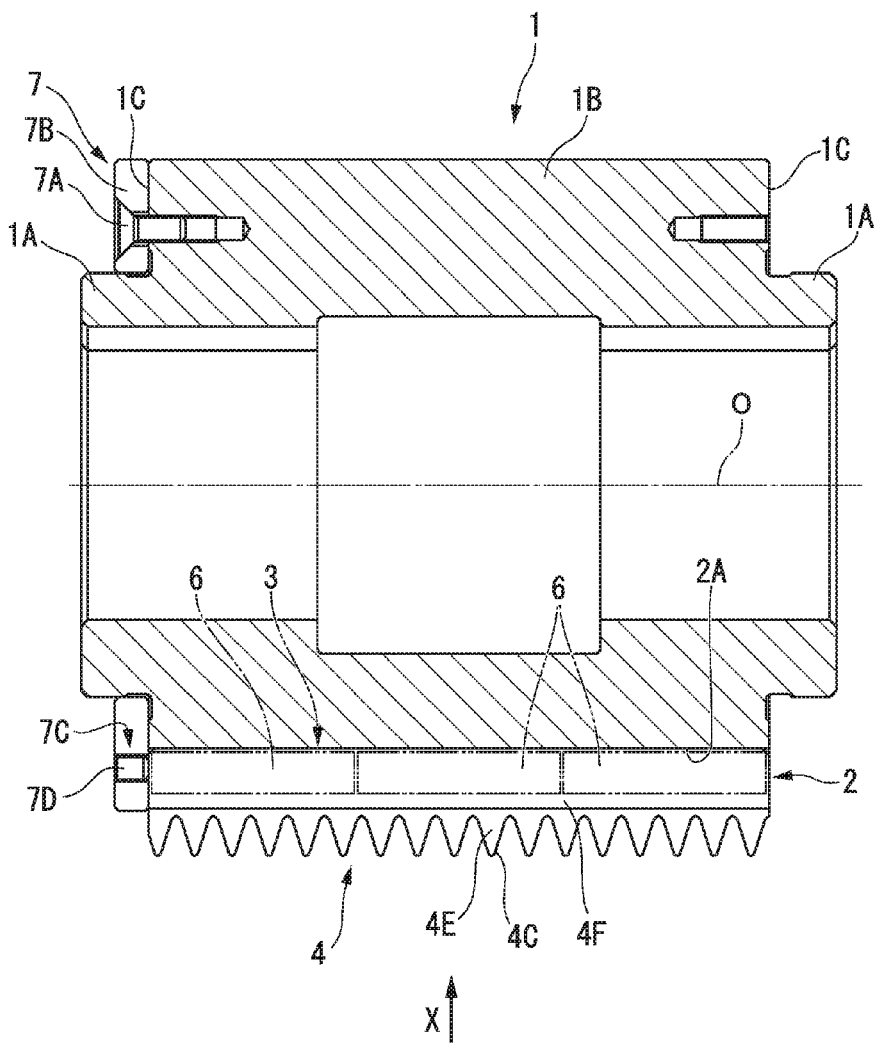
FIG. 3 is a side sectional view of the first embodiment shown in FIG. 1.
Figure 4:
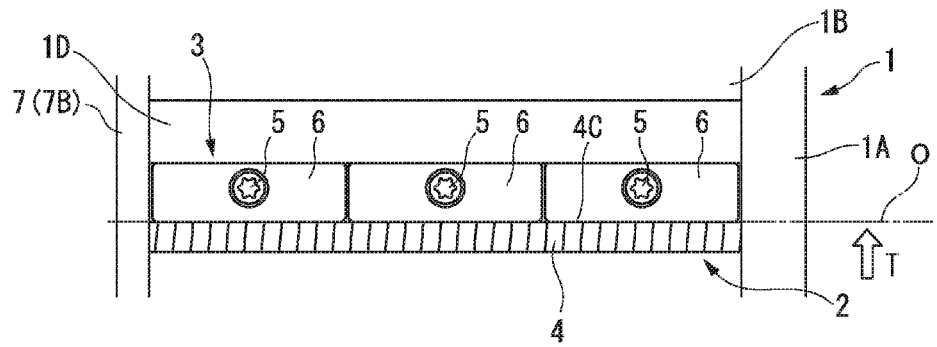
FIG. 4 is a partial bottom view as seen in a direction of arrow X in FIG. 3.
Figure 5:
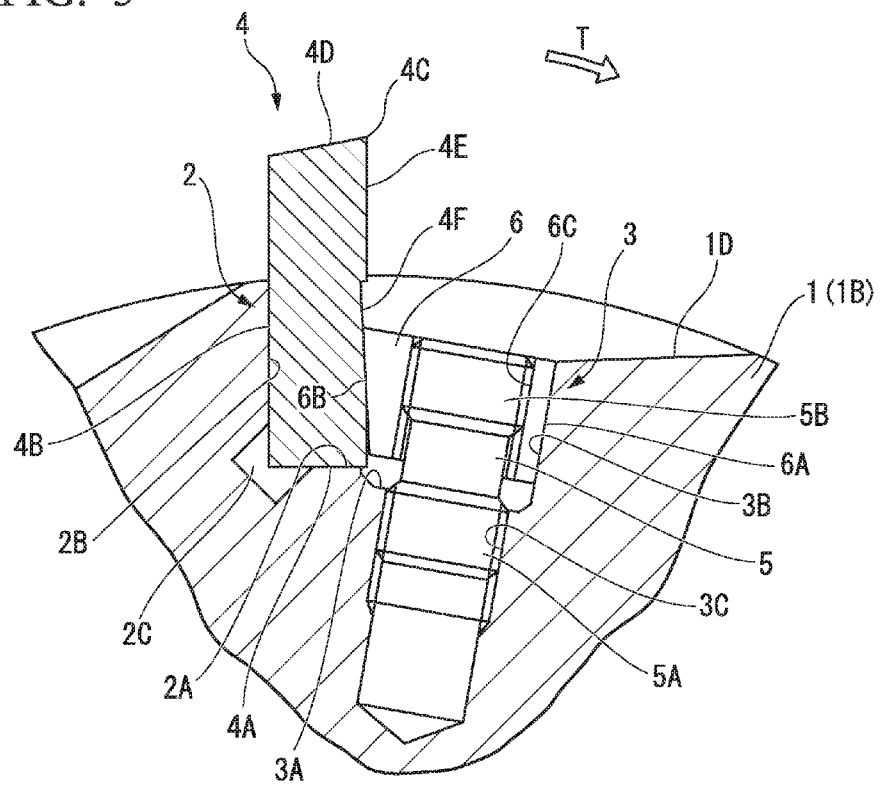
FIG. 5 is an enlarged sectional view around an attachment seat of the first embodiment shown in FIG. 1.

The width, in the radial direction of the hob body 1, of the blade 4 seated on the attachment seat 2 in this way, is made to be greater than the depth of the attachment seat 2 from the outer peripheral surface of the trunk part 1B of the hob body 1 to the bottom surface 2A. Therefore, the blade 4 protrudes from the outer peripheral surface of the trunk part 1B, and a cutting edge 4C that extends in a direction parallel to the direction of the center axis O is formed in this protruded portion. The cutting edge 4C, as shown in FIG. 3, is formed in a sawtooth shape that protrudes in the radial direction of the hob body 1. In the first embodiment, the sizes or the pitches of the sawteeth that are formed in the cutting edges 4C in the individual blades 4 are constant, the sizes or the pitches of the sawteeth that are formed in the cutting edges 4C of the blades 4 attached to the respective attachment seats 2 are also made to be equal to each other, and the lengths of the blades 4 in the direction of the center axis O is also made to be equal to each other.

Meanwhile, between the blades 4 attached to the attachment seats 2 adjacent to each other in the circumferential direction of the hob body 1, the saw-toothed cutting edge of one of the blades 4 is out of phase with the saw-toothed cutting edge of the other in the direction of the center axis O in a state where the respective blades 4 are attached to the attachment seats 2 with the positions of end surfaces thereof in the direction of the center axis O being aligned with each other. That is, between the blades 4 adjacent to each other in the circumferential direction, rotational tracks of the saw-toothed cutting edges 4C around the center axis O do not overlap each other in a state where the blades are attached to the hob body 1 with the end surfaces of the blades in the direction of the center axis O being aligned with each other, and are offset from each other in the direction of the center axis O.

Here, the cutting edges 4C of the blades 4 are formed in order in which the cutting edges are lined up in a direction reverse to the rotational direction T on the outer peripheral surface of the hob body 1 such that the phases of the sawteeth formed in the cutting edges 4C are sequentially offset from each other at equal intervals from a first end toward a second end (from a right end to a left end in FIGS. 3 and 4) in the direction of the center axis O. Therefore, protrusions that become convex to the outside of the saw-teeth of the cutting edges 4C of the blades 4 are arranged at the outer periphery of the hob body 1 so as to be twisted with a constant lead from the first end toward the second end in the direction of the center axis O toward the backward side in the rotational direction T and so as to form one row or a plurality of rows.

In addition, a surface, which is connected to the backward side of each cutting edge 4C in the rotational direction T and faces the radial outer side of the hob body 1, serves as a flank surface 4D of each blade 4. The flank surface 4D is given a flank angle so as to slope toward the radial inner side of the hob body 1 as it becomes closer to the backward side in the rotational direction T from the cutting edge 4C, and is given a lead equal to a lead formed by the row of the above cutting edge 4C so as to be twisted from the first end toward the second end (from the right end to the left end in FIGS. 3 and 4) in the direction of the center axis O as it becomes closer to the backward side in the rotational direction T.

Meanwhile, a surface, which is connected to the cutting edge 4C and faces the forward side in the rotational direction T closer to the radial outer side of the hob body 1 than the seating surface 4A, serves as a rake surface 4E of each blade 4, and the rake surface 4E is formed so as to be located on a plane including the center axis O in a state where the blade 4 is seated on each attachment seat 2. Additionally, the above seating surface 4A of the blade 4 is formed perpendicularly to the above back surface 4B.

Moreover, a surface 4F to be pressed is formed in a portion that is directed to the forward side in the rotational direction T, is located closer to the radial inner side of the hob body 1 than the rake surface 4E, and faces the above recess 3 similar to the rake surface 4E of the blade 4. The surface 4F to be pressed is formed in an inclined plane such that the thickness of the blade 4 becomes gradually smaller with respect to the rake surface 4E toward the radial outer side (rake surface 4E side) of the hob body 1, and is connected to the rake surface 4E via a small step that is slightly recessed to the back surface 4B side. The surface 4F to be pressed is formed over the entire length of the blade 4 with a constant width from the seating surface 4A. In a state where the blade 4 is seated on the attachment seat 2 as described above, the surface 4F to be pressed is inclined so as to be spaced apart from the above wall surface 3B of the recess 3 as it becomes closer to the radial outer side of the hob body 1.

The blade 4 seated on the attachment seat 2 is attached to the hob body 1 with a clamp screw 5 by a plurality of wedge members 6 mounted on the recess 3 being made to abut against the above surface 4F to be pressed. Male thread parts 5A and 5B that are twisted in mutually opposite directions are formed at both end parts of the clamp screw 5, and one male thread part 5A is screwed to a screw hole 3C of the recess 3. By screwing the male thread part 5A into the screw hole 3C, the surface 4F to be pressed of the blade 4 is pressed by the wedge members 6, and the blade 4 is fastened to the hob body 1 so as to be sandwiched between the hob body 1 and the wedge members 6.

Each of the wedge members 6 is formed in a plate shape or a pillar shape including a planar side surface 6A that is directed to the forward side in the rotational direction T and slides on the wall surface 3B of the recess 3, and a planar pressing surface 6B that is directed to the backward side in the rotational direction T and presses the above surface 4F to be pressed. The wedge members 6 are installed in the recess 3 such that the longitudinal direction of each of the wedge members 6 is parallel to the direction of the center axis O. The pressing surface 6B is inclined so as to be spaced apart from the side surface 6A as it becomes closer to the radial outer side of the hob body 1, the wedge member 6 is formed in a trapezoidal sectional shape, and an inclination angle at which the pressing surface 6B is formed with respect to the side surface 6A is made to be approximately equal to an the inclination angle at which the surface 4F to be pressed of the blade 4 seated on the attachment seat 2 is formed with respect to the wall surface 3B of the recess 3.

Additionally, a screw hole 6C into which the male thread part 5B formed at the second end part of the above clamp screw 5 is screwed is formed between the above side surface 6A and the above pressing surface 6B at the wedge member 6. The screw hole 6C is formed so as to be coaxial with the screw hole 3C of the recess 3 as seen in the direction of the center axis O when the side surface 6A is brought into close contact with the wall surface 3B of the recess 3.

Also, in the first embodiment, a plurality of (three) the wedge members 6 that are the same as the number of screw holes 3C formed in one recess 3 are mounted on the recess 3 so as to be lined up in the direction of the center axis O by one clamp screw 5 screwed into each of the screw holes 3C. That is, one blade 4 seated on the attachment seat 2 is attached to the hob body by the plurality of wedge members 6.

The plurality of wedge members 6 mounted on one recess 3 have the same shape and the same size as each other, the length of each wedge member 6 in the direction of the center axis O is made to be slightly shorter than a length obtained by dividing the length of the recess 3 in the direction of the center axis O by the number of wedge members 6 to be mounted, and one screw hole 6C is formed at a central part of each wedge member 6 in the direction of the center axis O in one wedge member 6. Accordingly, a slight gap is made between the wedge members 6 that are mounted on one recess 3 and are adjacent to each other in the direction of the center axis O.

By mounting such wedge members 6 on the recess 3 with the clamp screws 5, the blade 4 seated on the attachment seat 2 is fixed to the attachment seat 2 by the surface 4F to be pressed being pressed and the seating surface 4A and the back surface 4B being respectively pressed against the bottom surface 2A and the wall surface 2B of the attachment seat 2. The positions, in the direction of the center axis O, of the blades 4 fixed to the plurality of attachment seats 2, are adjusted such that the protrusions of the sawteeth formed in the cutting edges 4C as described above form one spiral row or a plurality of spiral rows with a constant lead.

Figure 2:
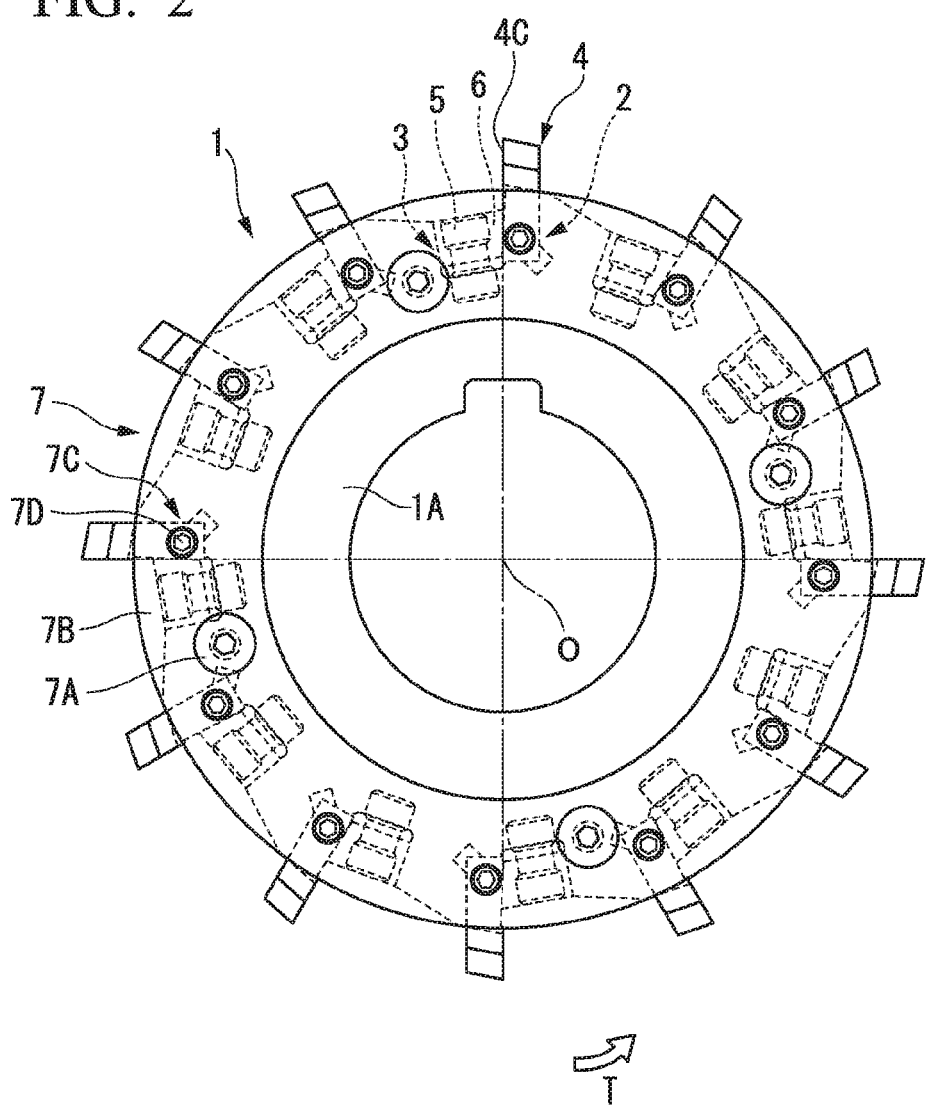
FIG. 2 is a back view as the first embodiment shown in FIG. 1 is seen from the other end side (a left side in FIG. 3) in the center axis direction.

Here, in the first embodiment, to adjust the positions of each blade 4 in the direction of the center axis O in this way, the hob body 1 is provided with an adjuster 7. In the first embodiment, as shown in FIGS. 2 and 3, the adjuster 7 is configured such that a screw hole 7C is formed in an annular plate-shaped plate 7B fitted into first end part 1A of the hob body 1, detachably attached to a first end surface 1C of the trunk part 1B by an attachment screw 7A and centered on the center axis O so as to communicate with each attachment seat 2 opening to the first end surface 1C and pass through the plate 7B in the direction of the center axis O, and an adjusting screw 7D is screwed into the screw hole 7C.

In order to adjust the position of each blade 4 in the direction of the center axis O using such adjuster 7, a temporary fastened state where the wedge members 6 are loaded into the recess 3 by the clamp screws 5 but the blade 4 is simply pressed to some extent by the wedge members 6 without screwing in the clamp screws 5 completely after the blade 4 is seated on the attachment seat 2 as described above, is brought about. Since the blade 4 moves from this state to the second end part 1A side of the hob body 1 by screwing in the adjusting screw 7D to make the adjusting screw abut against the blade 4 in the direction of the center axis O, and further screwing in and pressing the adjusting screw 7D, the clamp screws 5 may be completely screwed in and fixed to the attachment seat 2 in a place where the blade 4 is disposed at a predetermined position.

In addition, in the first embodiment, the attachment seat 2 on which each blade 4 is mounted opens to both the end surfaces 1C of the trunk part 1B of the hob body 1. Thus, whether or not each blade 4 is disposed at a predetermined position can be detected by making a terminal of a measuring instrument abut against the blade 4 from a second end surface 1C side of the trunk part 1B to which the plate 7B of the adjuster 7 is not attached, and by measuring the position of the blade 4 in the direction of the center axis O. However, the position of the blade 4 in the direction of the center axis O may be corrected by providing the both end surfaces 1C of the trunk part 1B of the hob body 1 with the adjuster 7 as described above and by screwing in the adjusting screw 7D on the second end surface 1C side after the adjusting screw 7D is loosened when the adjusting screw 7D of the adjuster 7 on the first end surface 1C side is excessively screwed in. Additionally, the adjuster 7 may be removed from the hob body 1 after the position of the blade 4 in the direction of the center axis O is adjusted.

While the sectional hob assembled such that the position of the blade 4 in the direction of the center axis O is adjusted in this way is rotated in the rotational direction T around the center axis O as described above, the cutting edge 4C of the blade 4 is cut into a rotating workpiece to form a tooth form in a peripheral surface of the workpiece through gear cutting work to produce a gear.

In this case, in the sectional hob of the above configuration, one blade 4 seated on the attachment seat 2 is pressed and attached by the plurality of (three in the first embodiment) wedge members 6 lined up in the direction of the center axis O of the hob body 1. Thus, a large contact area between the surface 4F to be pressed of the one blade 4 and the pressing surfaces 6B of the wedge members 6 can be secured, and the plate-shaped blade 4 extending in the direction of the center axis O can be pressed and attached in a plurality of same places in the direction of the center axis O. For this reason, it is possible to stably attach the blade 4 to the hob body 1, chattering can be prevented from occurring in the blade 4 at the time of gear cutting work, and high machining precision can be obtained.

Additionally, in the first embodiment, each of the plurality of wedge members 6 that press the one blade 4 in this way is formed in a plate shape or a pillar shape that extends in the direction of the center axis O, and the blade 4 is pressed by the plurality of wedge members 6 over the substantially entire length thereof. For this reason, a still larger contact area between the blade 4 and the wedge members 6 can be secured, the blade 4 can be more stably attached to the hob body 1, and machining precision can be improved.

Moreover, the surface 4F to be pressed of the blade 4 that touches the wedge members 6 is formed so as to be recessed with respect to the rake surface 4E such that the thickness of the blade 4 becomes smaller as it approaches an outer periphery of the hob body 1, in a state where the blade 4 is fixed to the hob body 1. By the pressing surfaces 6B of the wedge members 6 being brought into contact with and pressed against the surface 4F to be pressed, the blade 4 can be attached so as not to slip out to the radial outer side of the hob body 1. For this reason, even in a case where the hob body 1 is rotated at a high speed at the time of gear cutting work, chattering can be prevented from occurring in the blade 4, and it is possible to more stably hold the blade 4 and to perform high-efficiency gear cutting work.

Figure 6:
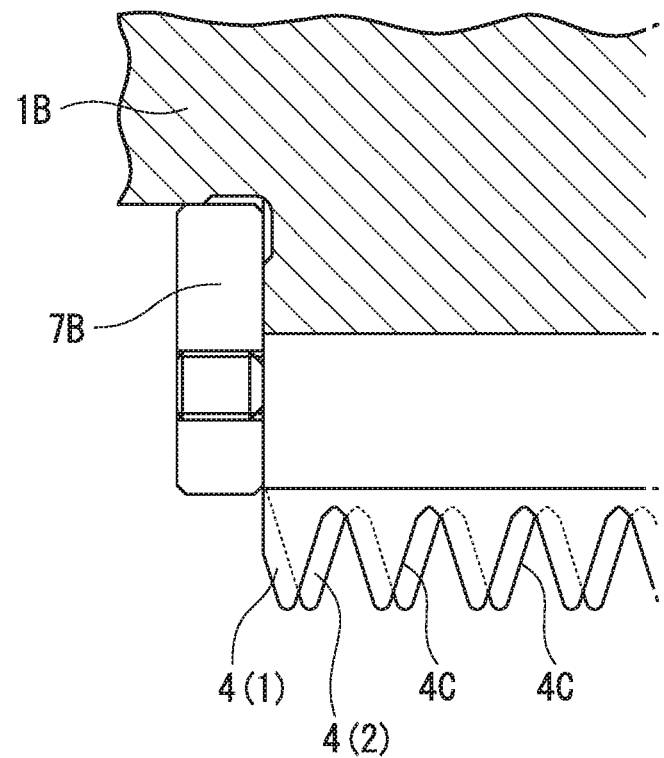
FIG. 6 is an enlarged sectional view showing the phases of cutting edges of two adjacent blades.

Meanwhile, in the first embodiment, in between the blades 4 adjacent to each other so as to be positioned side-by-side without offsetting in the circumferential direction among the plurality of blades 4 attached to the hob body 1, the above cutting edges 4C that extend in a sawtooth shape are formed such that the phases thereof in the direction of the center axis O are out from each other when the blades 4 are attached with the positions of end surfaces thereof in the direction of the center axis O being aligned with each other, and rows of the spiral cutting edges 4C are formed at the outer periphery of the hob body 1 by the cutting edges 4C of which the phases are offset from each other in this way. That is, as shown in FIG. 6, an arbitrary blade 4(1), which is a first blade of the present invention, of the plurality of blades 4 and a blade 4(2), which is a second blade of the present invention, adjacent to the blade 4(1) are different from each other in their respective shapes such that the phase of the saw-toothed cutting edge 4C of the blade 4 (1) is out in the direction of the center axis O with respect to the phase of the saw-toothed cutting edge 4C of the blade 4(2), in a state where both end surfaces thereof are positioned side-by-side without offsetting each other in the direction of the center axis O and fixed to the hob body 1. For this reason, since gear cutting work can be performed with the positions of the individual blades 4 in the direction of the center axis O being substantially the same as each other, the rotation balance of the hob body 1 can be improved, and it is possible to perform high-precision gear cutting work.

Moreover, the positions, in the direction of the center axis O, of the blades 4 attached in this way can be adjusted by the above adjuster 7 in the first embodiment. Therefore, according to the first embodiment, higher-precision gear cutting work can be performed by precisely disposing the respective blades 4 at predetermined positions by the adjuster 7.

However, when the positions of the end surfaces in the direction of the center axis O are aligned with each other in the plurality of blades 4 as described above, the cutting edges 4C are formed such that the phases thereof in the direction of the center axis O are offset from each other. Instead of this, when the positions of the end surfaces of the blades 4 are aligned with each other, the rows of the spiral cutting edges 4C may be formed at the outer periphery of the hob body 1 by attaching the plurality of blades 4 having the same shape and the same size and also having coinciding rotational tracks of the cutting edges 4C around the center axis O to the attachment seat 2 and offsetting the positions of the blades 4 themselves in the direction of the center axis O by the above adjuster 7. Additionally, in the first embodiment, the pitch of the sawteeth formed in the cutting edge 4C in each blade 4 is made to be constant. However, for example, a blade having a missing tooth-shaped cutting edge in which teeth are missing at predetermined positions.

Figure 7:
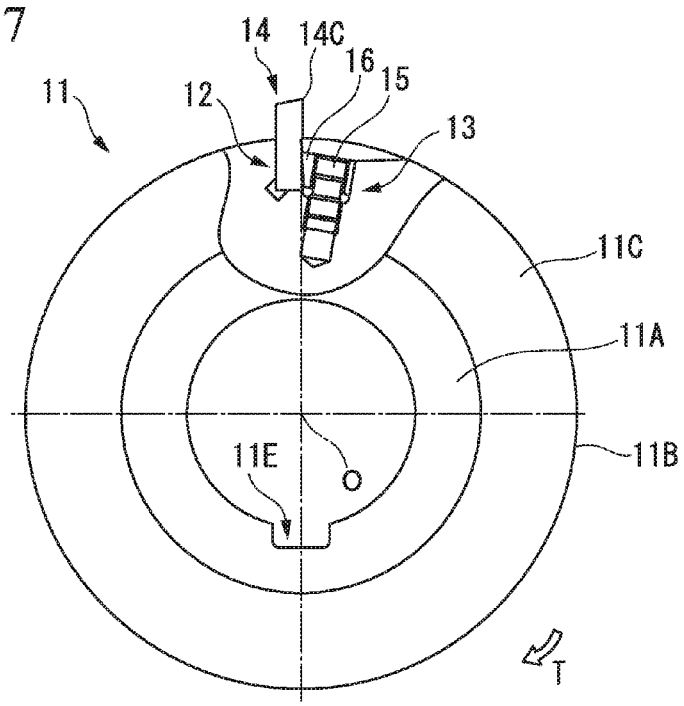
FIG. 7 is a partially fractured front view as a second embodiment of the invention is seen from one end side (the right side in FIG. 9) in the axis direction.
Figure 11:
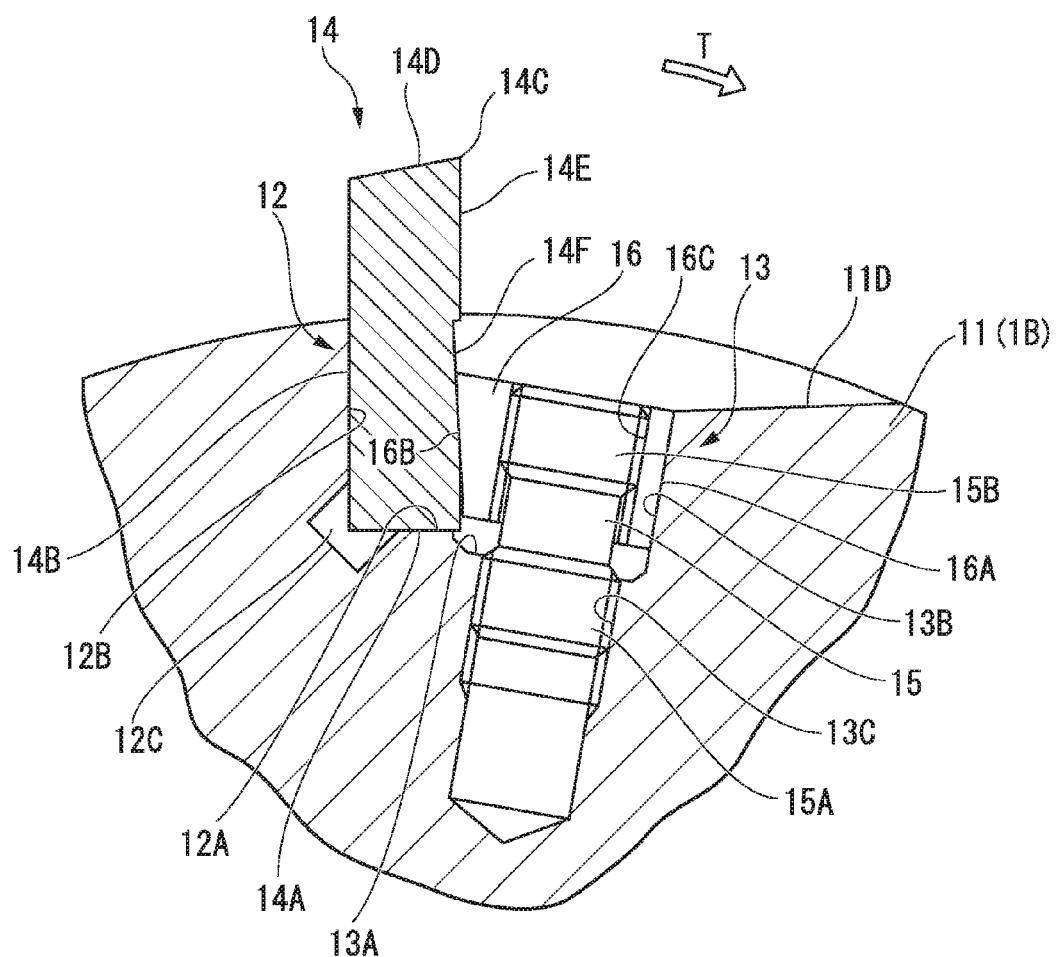
FIG. 11 is an enlarged sectional view around an attachment seat of the second embodiment shown in FIG. 7.

FIG. 11 shows a second embodiment of the invention from FIG. 7. In the second embodiment, the hob body 11 is formed of a steel material or the like and is formed in a multi-step cylindrical outer shape in which both end parts 11A in a direction of a center axis O have mutually equal external diameters and have a smaller diameter than a trunk part 11B therebetween and which is centered on the center axis O. A rotating shaft of a hobbing machine is attached to the inside of the hob body in a radial direction, and performs gear cutting work while being rotated in a rotational direction T around the above center axis O.

One recessed groove-shaped attachment seat 12, which is recessed from an outer peripheral surface of the trunk part 11B to a radial inner side of the hob body 11 and extends parallel to the center axis O, is formed over the entire length in the direction of the center axis O in the outer peripheral surface of the trunk part 11B having a greater diameter than both the end parts 11A of the hob body 11, and opens to both end surfaces 11O of the trunk part 11B. The attachment seat 12 includes a bottom surface 12A that faces a radial outer side of the hob body 11, and a wall surface 12B that is perpendicular to the bottom surface 12A and faces a forward side in the above rotational direction T, and a flank part 12C that is recessed in a channel (groove) shape is formed at a corner where the bottom surface 12A and the wall surface 12B intersect each other.

Additionally, a recess 13, which is adjacent to the attachment seat 12 in a circumferential direction and communicates with the attachment seat 12, is formed in an outer peripheral part of the above trunk part 11B. In the second embodiment, the recess 13 is formed adjacent to the forward side of the attachment seat 12 in the rotational direction T, and has a bottom surface 13A that is located slightly closer to the radial inner side of the hob body 11 than the bottom surface 12A of the attachment seat 12, and a wall surface 13B that is located on the forward side of the bottom surface 13A in the rotational direction T and widens from the bottom surface 13A to the radial outer side of the hob body 11 and faces a backward side in the rotational direction T. Only one recess 13 is formed over the entire length in the direction of the center axis O so as to extend parallel to the center axis O and open to both the end surfaces 11C of the trunk part 11B, similar to the attachment seat 12. Moreover, a plurality of (three in the second embodiment) screw holes 13C having centerlines extending parallel to the wall surface 13B on a plane perpendicular to the center axis O are formed at equal intervals in the direction of the center axis O in the bottom surface 13A of the recess 13.

Moreover, an inclined surface 11D, which approaches an outer peripheral surface of the hob body 11 as it becomes closer to the forward side in the rotational direction T from an outer peripheral edge of the above wall surface 13B of each recess 13, is formed in the outer peripheral surface of the trunk part 11B. The inclined surface 11D is cut and raised up in the outer peripheral surface of the trunk part 11B immediately before reaching the wall surface 12B of the attachment seat 12 adjacent to the backward side of the recess 13 in the rotational direction T, and forms a bottom surface of a chip pocket. In addition, a key groove 11E, which is fitted to a key provided in a rotating shaft of a hobbing machine is formed on a side opposite to the above attachment seat 12 across the center axis O at the inside of the hob body 11 in the radial direction.

A blade 14 is detachably attached to the above attachment seat 12. Therefore, the hob of the second embodiment is a sectional hob, and the number of blades 14 to be attached to one hob body 11 is also only one.

The blade 14 is formed in a flat plate shape using a hard material, such as cemented carbide, a seating surface 14A directed to the radial inner side of the hob body 11 is brought into close contact with and made to abut against the bottom surface 12A of the attachment seat 12 with a thickness direction of this flat plate being directed to the circumferential direction of the hob body 11, and a back surface 14B directed to the backward side in the rotational direction T is seated on the attachment seat 12 in a state where the back surface 14B is brought into close contact with and made to abut against the wall surface 12B. In the second embodiment, the blade 14 having a length approximately equal to the length of the trunk part 11B of the hob body 11 in the direction of the center axis O is attached to the above attachment seat 12.

Figure 9:
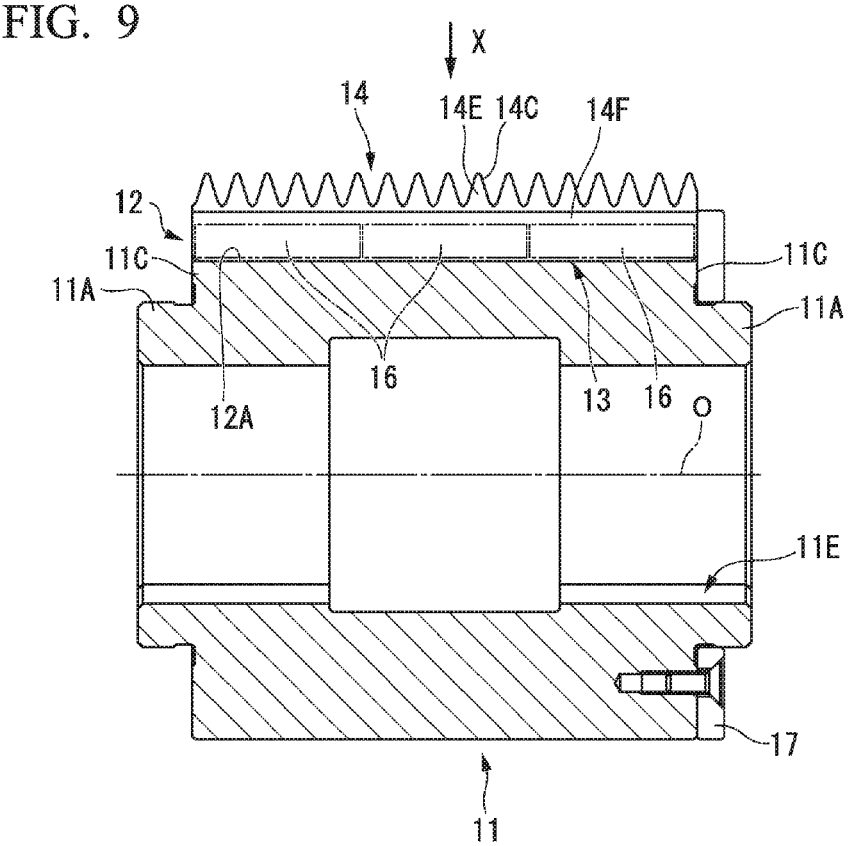
FIG. 9 is a side sectional view of the second embodiment shown in FIG. 7.

The width, in the radial direction of the hob body 11, of the blade 14 seated on the attachment seat 12 in this way, is made to be greater than the depth of the attachment seat 12 from the outer peripheral surface of the trunk part 11B of the hob body 11 to the bottom surface 12A. Therefore, the blade 14 protrudes from the outer peripheral surface of the trunk part 11B, and a cutting edge 14C that extends in a direction parallel to the direction of the center axis O is formed in this protruded portion. The cutting edge 14C, as shown in FIG. 9, is formed in a sawtooth shape that protrudes in the radial direction of the hob body 11. Therefore, the number of cutting edges 14C to be provided in one hob body 11 is also only one. In addition, in the second embodiment, the size and the pitch of the sawteeth that are formed in the cutting edge 14C in the blade 14 are set to be constant.

Figure 10:
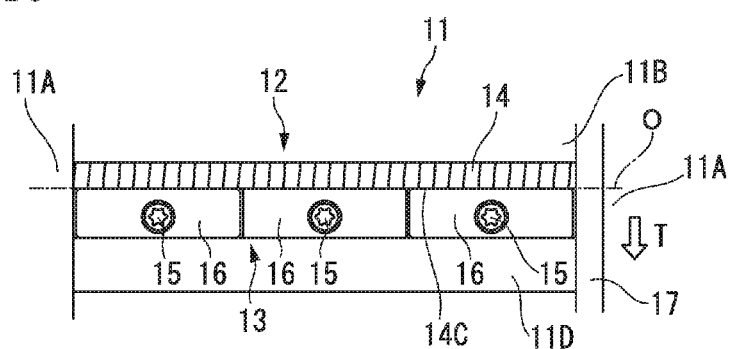
FIG. 10 is a partial plan view as seen in a direction of arrow X in FIG. 9.

Additionally, a surface, which is connected to the backward side of the cutting edge 14C in the rotational direction and faces the radial outer side of the hob body 11, serves as a flank surface 14D of the blade 14. The flank surface 14D is given a flank angle so as to face the radial inner side of the hob body 11 as it becomes closer to the backward side in the rotational direction T from the cutting edge 14C, and is given a lead so as to be twisted from first end toward the second end (from the right end to the left end in FIGS. 9 and 10) in the direction of the center axis O as it becomes closer to the backward side in the rotational direction T.

Meanwhile, a surface, which is connected to the cutting edge 14C and faces the forward side in the rotational direction T closer to the radial outer side of the hob body 11 than the seating surface 14A, serves as a rake surface 14E of the blade 14, and the rake surface 14E is formed so as to be located on a plane including the center axis O in a state where the blade 14 is seated on the attachment seat 12. Additionally, the above seating surface 14A of the blade 14 is formed perpendicularly to the above back surface 14B.

Moreover, similar to the rake surface 14E, a surface 14F to be pressed of the blade 14 is formed in a portion that is directed to the forward side in the rotational direction T, is located closer to the radial inner side of the hob body 11 than the rake surface 14E, and faces the above recess 13. The surface 14F to be pressed is formed in an inclined plane that faces the above back surface 14B side such that the thickness of the blade 14 becomes gradually smaller with respect to the rake surface 14E as it becomes closer to the radial outer side (rake surface 14E side) of the hob body 11, and is connected to the rake surface 14E via a small step that is slightly recessed to the back surface 14B side. Such a surface 14F to be pressed is formed over the entire length of the blade 14 with a constant width from the seating surface 14A, and the surface 14F to be pressed is inclined so as to be spaced apart from the above wall surface 13B of the recess 13 as it becomes closer to the radial outer side of the hob body 11, in a state where the blade 14 is seated on the attachment seat 12 as described above.

The blade 14 seated on the attachment seat 12 is attached to the hob body 11 with a clamp screw 15 by a plurality of wedge members 16 mounted on the recess 13 being made to abut against the above surface 14F to be pressed. By forming male thread parts 15A and 15B twisted in mutually opposite directions in both end parts of the clamp screw 15 and screwing one male thread part 15A into a screw hole 13C of the recess 13, the surface 14F to be pressed of the blade 14 is pressed by the wedge members 16, and the blade 14 is fastened to the hob body 11 so as to be sandwiched between the hob body 11 and the wedge members 16.

The wedge member 16 is formed in a plate shape or a pillar shape including a planar side surface 16A that is directed to the forward side in the rotational direction T and slides on the wall surface 13B of the recess 13, and a planar pressing surface 16B that is directed to the backward side in the rotational direction T and presses the above surface 14F to be pressed. The wedge members 6 are installed in the recess 13 such that the longitudinal direction of each of the wedge members 6 is parallel to the direction of the center axis O. The pressing surface 16B is inclined so as to be spaced apart from the side surface 16A as it becomes closer to the radial outer side of the hob body 11, the wedge member 16 is formed in a trapezoidal sectional shape, and an inclination angle at which the pressing surface 16B is formed with respect to the side surface 16A is made to be approximately equal to an the inclination angle at which the surface 14F to be pressed of the blade 14 seated on the attachment seat 12 is formed with respect to the wall surface 13B of the recess 13.

Additionally, a screw hole 16C into which the male thread part 15B formed at the second end part of the above clamp screw 15 is screwed is formed between the above side surface 16A and the above pressing surface 16B at the wedge member 16. The screw hole 16C is formed so as to be coaxial with the screw hole 13C of the recess 13 as seen in the direction of the center axis O when the side surface 16A is brought into close contact with the wall surface 13B of the recess 13.

Moreover, in the second embodiment, a plurality of (three) the wedge members 16 that are the same as the number of screw holes 13C formed in one recess 13 are mounted on the recess 13 so as to be lined up in the direction of the center axis O by one clamp screw 15 screwed into each of the screw holes 13C. That is, one blade 14 seated on the attachment seat 12 is attached by the plurality of wedge members 16.

The plurality of wedge members 16 mounted on the recess 13 have the same shape and the same size as each other, the length of each wedge member 16 in the direction of the center axis O is made to be slightly shorter than a length obtained by dividing the length of the recess 13 in the direction of the center axis O by the number of wedge members 16 to be mounted, and one screw hole 16C is formed at a central part of each wedge member 16 in the direction of the center axis O in one wedge member 16. Accordingly, a slight gap is made between the wedge members 16 that are mounted on the recess 13 and are adjacent to each other in the direction of the center axis O.

Figure 8:
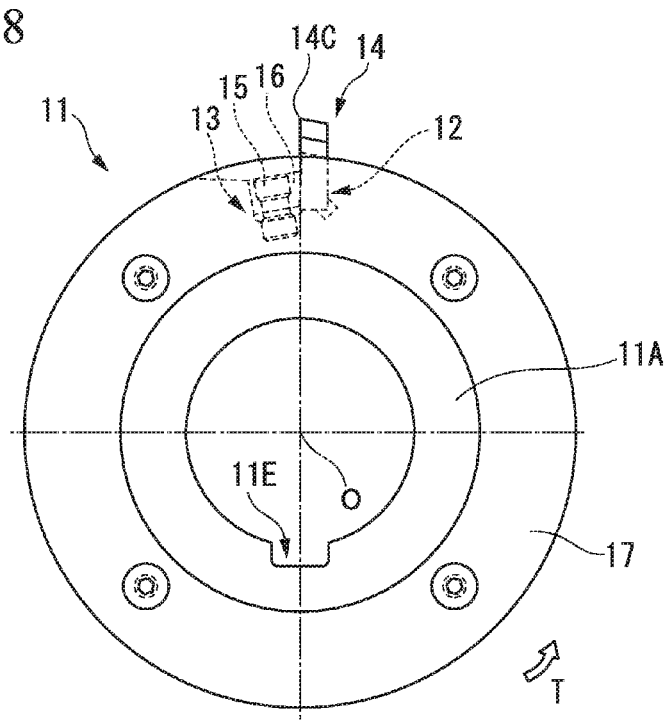
FIG. 8 is a back view as the second embodiment shown in FIG. 7 is seen from the other end side (the right side in FIG. 9) in the axis direction.

By mounting such wedge members 16 on the recess 13 with the clamp screws 15, the blade 14 seated on the attachment seat 12 is fixed to the attachment seat 12 by the surface 14F to be pressed being pressed and the seating surface 14A and the back surface 14B being respectively pressed against the bottom surface 12A and the wall surface 12B of the attachment seat 12. In addition, in the second embodiment, as shows in FIGS. 8 and 9, an annular plate-shaped plate 17 having an external diameter approximately equal to the trunk part 11B is fitted from the second end part 11A of the hob body 11, and is screw-fastened to a second end surface 11C of the trunk part 11B, and the blade 14 is positioned in the direction of the center axis O such that an end surface thereof that faces the second end side in the direction of the center axis O is made to abut against the plate 17.

In the hob configured in this way, the outer peripheral part of the hob body 11 is provided with only one row of saw-toothed cutting edge 14C for forming a tooth form in a workpiece. Thus, it is not necessary to perform phase matching with another row of cutting edge, and gear cutting work can be performed through control of a hobbing machine, for example, by simple positioning to such a degree that the end surface of the blade 14 is made to abut against the plate 17 as described above.

Additionally, in the second embodiment, the above configuration is applied to the sectional hob in which only one blade 14 in which one row of cutting edge 14C as described above is formed is detachably attached to only one attachment seat 12 formed in the hob body 11. For this reason, the blade 14 may be replaced when wear or damage has occurred in the cutting edge 14C, and a new blade 14 in that case can also be positioned with the simple operation as described above. Even in such a sectioning hob, positioning of the blade 14 is easy. Thus, structure can be simplified without requiring adjuster like the adjusting screw of the hob described in Patent Document 1.

Additionally, in the second embodiment, the rotating shaft of the hobbing machine is attached to the inside of the cylindrical hob body 11 in the radial direction in this way. However, the invention can also be applied to a hob with a handle that performs gear cutting work, for example, by a handle (shank) extending along the above center axis O being formed in the hob body and by the handle being attached to a main shaft of a machine tool and being rotated.

Meanwhile, in the second embodiment, in such a sectional hob as described above, one blade 14 seated on the attachment seat 12 is pressed and attached by the plurality of (three in the second embodiment) wedge members 16 lined up in the direction of the center axis O of the hob body 11. Thus, a large contact area between the surface 14F to be pressed of the one blade 14 and the pressing surfaces 16B of the wedge members 16 can be secured, and the plate-shaped blade 14 extending in the direction of the center axis O can similarly be pressed and attached in a plurality of same places in the direction of the center axis O. For this reason, it is possible to stably attach the blade 14 to the hob body 11, chattering can be prevented from occurring in the blade 14 at the time of gear cutting work, and high machining precision can be obtained.

Additionally, in the second embodiment, each of the plurality of wedge members 16 that press the one blade 14 in this way is formed in a plate shape or a pillar shape that extends in the direction of the center axis O, and the blade 14 is pressed by the plurality of wedge members 16 over the substantially entire length thereof. For this reason, a still larger contact area between the blade 14 and the wedge members 16 can be secured, the blade 14 can be more stably attached to the hob body 11, and machining precision can be improved.

Moreover, the surface 14F to be pressed of the blade 14 is formed in a concave surface shape with respect to the rake surface 14E such that the thickness of the blade 14 becomes smaller as it approaches an outer periphery of the hob body 11, in a state where the blade 14 is fixed to the hob body 11. By the pressing surfaces 16B of the wedge members 16 being brought into contact with and pressed against the surface 14F to be pressed, the blade 14 can be attached so as not to slip out to the radial outer side of the hob body 11. For this reason, even in a case where the hob body 11 is rotated at a high speed at the time of gear cutting work, chattering can be prevented from occurring in the blade 14, and it is possible to more stably hold the blade 14 and to perform high-efficiency gear cutting work.

Also, in the second embodiment, the number of rows of cutting edges 14C to form (create) a tooth form in a workpiece (creation) is one. However, for example, a chamfering edge that chamfers projecting ends, in a tooth height direction, of a tooth form formed by the cutting edge 14C may be provided at a position that is different from the cutting edge 14C. Additionally, in the second embodiment, the pitch of the sawteeth formed in the cutting edge 14C in the blade 14 is made to be constant. However, for example, a blade having a missing tooth-shaped cutting edge in which teeth are missing at predetermined positions may be used.

Moreover, in order to take the rotation balance of the hob, for example, a balance blade that does not perform gear cutting may be provided on a side opposite to the cutting edge 14C across the center axis O. Additionally, the hob of the above second embodiment may be configured by attaching the blade 14 only to one attachment seat 12 of the hob body 11 including the plurality of attachment seats 12 (grooves) as described in Patent Document 1. Furthermore, one row of cutting edge 14C may extend in the direction in which the center axis O of the hob body 11 extends, or may be twisted, for example, around the center axis O.

INDUSTRIAL APPLICABILITY

The invention relates to a sectional hob in which a blade in which a saw-toothed cutting edge is formed is detachably attached to an outer peripheral part of a hob body and which performs gear cutting work of a gear. According to the invention, a sectional hob with a high machining precision can be provided.

REFERENCE SIGNS LIST

1: HOB BODY
2: ATTACHMENT SEAT
3: RECESS
4: BLADE
4C: CUTTING EDGE
4F: SURFACE TO BE PRESSED
5: CLAMP SCREW
6: WEDGE MEMBER
6B: PRESSING SURFACE
7: ADJUSTER
O: CENTER AXIS OF HOB BODY 1
T: ROTATIONAL DIRECTION
11: HOB BODY
12: ATTACHMENT SEAT
13: RECESS
14: BLADE
14C: CUTTING EDGE
14F: SURFACE TO BE PRESSED
15: CLAMP SCREW
16: WEDGE MEMBER
16B: PRESSING SURFACE
T: ROTATIONAL DIRECTION

The invention claimed is:

1. A sectional hob comprising:
a cylindrical hob body having an attachment seat formed on an outer periphery of the hob body and a recess formed on the outer periphery of the hob body so as to be adjacent to the attachment seat in a circumferential direction of the hob body, wherein the recess is positioned on a forward side in a rotation direction of the sectional hob with respect to the attachment seat;
a single plate-shaped blade having a saw-toothed cutting edge, the plate-shaped blade being disposed in the attachment seat such that a direction of the cutting edge is parallel to a center axis direction of the hob body;
a plurality of wedge members positioned in the recess so as to detachably-fix the plate-shaped blade disposed in the attachment seat to the hob body by pushing the plate-shaped blade onto a wall surface of the attachment seat that is facing forward in the rotation direction, the plurality of the wedge members being installed in the recess, wherein the plurality of the wedge members are disposed in a line in the center axis direction in the recess; and a plurality of clamp screws respectively fastened into first screw holes formed in the hob body through second screw holes formed in the wedge members; and an adjuster mounted on the hob body to adjust the position of the plate-shaped blade in the center axis direction, wherein the adjuster includes an annular plate-shaped plate having a screw hole formed therein and which is attached to one end of the hob body in the center axis direction, and an adjusting screw screwed into the screw hole, wherein the screw hole is communicated with the attachment seat in the hob body, and the blade is capable of being adjusted its position with respect to the hob body in the center axis direction by screwing the adjusting screw into the screw hole so as to directly press the blade disposed in the attachment seat.

2. The sectional hob according to claim 1, wherein each of the wedge members is plate-shaped or pillar-shaped, and the wedge members are installed in the recess such that the longitudinal direction of each of the wedge members is parallel to the center axis direction.

3. The sectional hob according to claim 1, wherein a surface of the plate-shaped blade contacted with the wedge members in a state where the plate-shaped blade is fixed to the hob body is formed such that the thickness of the plate-shaped blade becomes smaller toward an outer periphery of the hob body.

4. The sectional hob according to claim 1, further comprising:

a plurality of the attachment seats formed in the hob body at intervals in the circumferential direction of the hob body;

a plurality of the plate-shaped blades respectively fixed to the plurality of the attachment seats of the hob body, and wherein a first one of the plurality of the plate-shaped blades is adjacent to a second one of the plurality of the plate-shaped blades so as to be positioned side-by-side without offsetting each other in the center axis direction along with a saw-toothed cutting edge of the first one of the plurality of the plate-shaped blades is out of phase with a saw-toothed cutting edge of the second one of the plurality of the plate-shaped blades.

5. The sectional hob according to claim 1, wherein a plurality of the attachment seats and a plurality of the recesses are formed in the hob body, and a plurality of the plate-shaped blades are each disposed in the recesses and detachably fixed to the hob body by fastening the clamp screws into the screw holes formed in the hob body through the second screw holes formed in the wedge members.

6. The sectional hob according to claim 1, wherein a first male thread part is formed at one end of the clamp screw and a second male thread part is formed at the other end of the clamp screw that is twisted in an opposite direction to the first male thread part, the first male thread part is screwed to a first screw hole of the recess, and the second male thread part is screwed to a second screw hole formed in the wedge member.

\* \* \* \* \*